US011622286B2

(12) United States Patent
Zhang (10) Patent No.: US 11,622,286 B2
(45) Date of Patent: Apr. 4, 2023

(54) VEHICLE-TO-INFRASTRUCTURE COMMUNICATION CONTROL (71) Applicant: Ford Global Technologies, LLC, Dearborn, MI (US)

(72) Inventor: Linjun Zhang, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 109 days.

(21) Appl. No.: 16/904,284

(22) Filed: Jun. 17, 2020

(65) Prior Publication Data

US 2021/0400500 A1   Dec. 23, 2021

(51) Int. Cl.
H04W 4/44     (2018.01)
H04W 24/02    (2009.01)
H04W 52/38    (2009.01)
H04W 64/00    (2009.01)
H04W 24/10    (2009.01)

(52) U.S. Cl.
CPC ............. *H04W 24/02* (2013.01); *H04W 4/44* (2018.02); *H04W 24/10* (2013.01); *H04W 52/386* (2013.01); *H04W 64/003* (2013.01)

(58) Field of Classification Search
CPC . H04W 24/02; H04W 64/003; H04W 52/386; H04W 24/10; H04W 4/44; H04W 4/02; H04W 52/245; H04W 4/40; H04W 4/46
See application file for complete search history.

(56) References Cited

U.S. PATENT DOCUMENTS 7,215,925 B2    5/2007  Holloway et al.
10,469,619 B2   11/2019 Shimizu et al.
2007/0087695 A1  4/2007  Cohen et al.
2015/0194039 A1  7/2015  Martin
2017/0325179 A1* 11/2017 Ameixieira .......... H04W 52/46
2018/0013655 A1* 1/2018  Ameixieira .......... H04W 4/029
2018/0144623 A1  5/2018  Shirakata et al.
2018/0242115 A1  8/2018  Kim et al.

(Continued)

FOREIGN PATENT DOCUMENTS

WO    2017066912 A1    4/2017
WO    2017133501 A1    8/2017

OTHER PUBLICATIONS

Weingart, "Standardisation of SPaT and MAP", Amsterdam INTERTRAFFIC 2014, Swarco (19 pages).

(Continued)

*Primary Examiner* — Marcus Hammonds
(74) *Attorney, Agent, or Firm* — Frank A. MacKenzie; Bejin Bieneman PLC (57) ABSTRACT A system includes an infrastructure element having a computer. The computer is programmed to receive one or more communication metrics, and node identification data including node location data, from each of a plurality of stationary communication nodes coverage area. The computer is programmed to generate a communication metrics table that identifies locations of the stationary communication nodes and specifies their respective communication metrics. The computer is programmed, based on the communication metrics table, to adjust a transmission parameter of the infrastructure element, the transmission parameter including at least one of a transmission power or a data throughput rate.

16 Claims, 4 Drawing Sheets (56) References Cited

U.S. PATENT DOCUMENTS

| | | |
|---|---|---|
| 2018/0343605 A1 | 11/2018 | Wu et al. |
| 2019/0028862 A1 | 1/2019 | Futaki |
| 2019/0132709 A1 | 5/2019 | Graefe et al. |
| 2019/0287396 A1 | 9/2019 | Sayin et al. |
| 2020/0280827 A1* | 9/2020 | Fechtel .................. H04W 8/08 |
| 2021/0400500 A1 | 12/2021 | Zhang |
| 2022/0103988 A1 | 3/2022 | Zhang |

OTHER PUBLICATIONS

Non-Final Office Action re U.S. Appl. No. 16/904,311, filed Jun. 17, 2020.
Notice of Allowance dated Oct. 31, 2022 re U.S. Appl. No. 16/904,311, filed Jun. 17, 2022.

* cited by examiner

VEHICLE-TO-INFRASTRUCTURE COMMUNICATION CONTROL

BACKGROUND

A vehicle can receive messages from an infrastructure element via one or more wireless communication networks and/or protocols, e.g., providing what can be referred to as V2X communications ("V2X" can stand for vehicle-to-everything communications). Data shared via V2X communications from the infrastructure element can include data about a weather condition, traffic condition, an ongoing roadside assistance, etc. However, reception of V2X communications may be adversely affected by environmental features, e.g., trees, buildings, terrain, etc. Providing data to a vehicle can be impaired or prevented.

DETAILED DESCRIPTION

Introduction

Disclosed herein is a system, comprising an infrastructure element having a computer programmed to receive one or more communication metrics, and node identification data including node location data, from each of a plurality of stationary communication nodes coverage area. The computer is programmed to generate a communications metrics table that and identifies locations of the stationary communication nodes and specifies their respective communication metrics. The computer is programmed, based on the communication metrics table, to adjust a transmission parameter of the infrastructure element, the transmission parameter including at least one of a transmission power or a data throughput rate.

The plurality of communication nodes may be located within a specified coverage area of the infrastructure element.

The one or more communication metrics may include at least one of a signal strength, a packet error rate, a channel busy ratio, or an inter-packet gap.

The computer of the infrastructure element may be further programmed to update the communication metrics table based on the received data upon receiving data including (i) updated communication metrics from one of the stationary communication nodes, or (ii) communication metrics of a new stationary communication node within a specified coverage area of the infrastructure element.

The computer of the infrastructure element may be further programmed to increase the transmission power of the infrastructure element upon determining that a signal strength of at least one of the stationary communication nodes within the specified range is less than a threshold.

The computer of the infrastructure may be further programmed to select a directional antenna of the infrastructure element based on an antenna direction and a geographic location of the stationary communication node reporting the respective signal strength being less than the threshold, and to increase the transmission power of the selected directional antenna based on the signal strength of the respective stationary communication node.

The computer of the infrastructure may be further programmed to reduce the data throughput of the infrastructure element upon determining that a packet error rate of at least one of the stationary communication nodes exceeds a threshold.

Each of the stationary communication nodes may include a processor that is programmed to determine the one or more communication metrics of the respective communication node, to relay a message received from the infrastructure element based on comparing the one or more communication metrics table to one or more thresholds, and to broadcast the one or more communication metrics and one or more node identification data that include the location.

The processor of each of the stationary communication nodes may be further programmed to ignore a received message for determining the one or more communication metrics upon determining that the message was received from a non-infrastructure source including a vehicle and a mobile device.

The processor of each stationary communication node may be further programmed to relay a message received from the infrastructure element upon determining that (i) a signal strength is less than a signal strength threshold, or a packet error rate exceed a packet error rate threshold, and (ii) a channel busy ratio is less than the channel busy ratio threshold.

Installation locations of the plurality of stationary communication nodes may be determined based on road locations, intersection locations in the coverage area of the infrastructure element.

Further disclosed herein is a system, comprising a plurality of stationary communication nodes, and an infrastructure element. The infrastructure element includes a computer programmed to receive one or more communication metrics, and node identification data including node location data, from each of the plurality of stationary communication nodes, to generate a communications metrics table that and identifies locations of the stationary communication nodes and specifies their respective communication metrics, and, based on the communication metrics table, to adjust a transmission parameter of the infrastructure element, the transmission parameter including at least one of a transmission power or a data throughput rate. Each of the plurality of stationary communication nodes include a processor that is programmed to determine one or more communication metrics of the respective communication node, to relay a message received from an infrastructure element based on comparing the one or more communication metrics table to one or more thresholds, and to broadcast the one or more communication metrics and one or more node identification data that include a communication node location.

Further disclosed herein is a method, comprising receiving one or more communication metrics, and node identification data including node location data, from each of a plurality of stationary communication nodes, generating a communications metrics table that and identifies locations of the stationary communication nodes and specifies their respective communication metrics, and based on the communication metrics table, adjusting a transmission parameter of an infrastructure element, the transmission parameter including at least one of a transmission power or a data throughput rate.

The method may further include updating the communication metrics table based on the received data upon receiving data including (i) updated communication metrics from one of the stationary communication nodes, or (ii) communication metrics of a new stationary communication node within a specified coverage area.

The method may further include increasing the transmission power of the infrastructure element upon determining that a signal strength of at least one of the stationary communication nodes within the specified range is less than a threshold.

The method may further include selecting a directional antenna of the infrastructure element based on an antenna direction and a geographic location of the stationary communication node reporting the respective signal strength being less than the threshold, and increasing the transmission power of the selected directional antenna based on the signal strength of the respective stationary communication node.

The method may further include reducing the data throughput of the infrastructure element upon determining that the packet error rate of at least one of the stationary communication nodes exceeds a threshold.

The method may further include determining, in each of the stationary communication nodes, the one or more communication metrics of the respective communication node, relaying a message received from the infrastructure element based on comparing the one or more communication metrics table to one or more thresholds, and broadcasting the one or more communication metrics and one or more node identification data that include the location.

The method may further include ignoring, in each of the stationary communication nodes, a received message for determining the one or more communication metrics upon determining that the message was received from a non-infrastructure source including a vehicle and a mobile device.

The method may further include relaying, in each of the stationary communication nodes, a message received from the infrastructure element upon determining that (i) a signal strength is less than a signal strength threshold, or a packet error rate exceed a packet error rate threshold, and (ii) a channel busy ratio is less than the channel busy ratio threshold.

Further disclosed is a computing device programmed to execute any of the above method steps.

Yet further disclosed is a computer program product, comprising a computer-readable medium storing instructions executable by a computer processor, to execute any of the above method steps.

Exemplary System Elements

An infrastructure element can broadcast messages via wireless communication networks and/or protocols, e.g., vehicle-to-everything (V2X) communications, within a coverage area of the infrastructure, e.g., within a range of a radio frequency (RF) transmitter, Such as 1000 meters (m) from the infrastructure element location. However, a reception quality of messages at a location within the coverage area of the infrastructure may vary based on environmental features such as trees, buildings, etc. In the present context, "reception quality" means one or more transmission quality measures. Such as signal strength, packet error rate, channel busy ratio, inter-packet gap, etc., determined at a receiver such as a vehicle or a stationary communication node within the coverage area.

The reception quality of messages can be improved by relaying messages by stationary communication nodes within the coverage area of the infrastructure element. An exemplary system includes a computer, e.g., of an infrastructure element, that can be programmed to receive communication metrics and node identification data including node location data, from each of a plurality of stationary communication nodes. The computer can be programmed to generate a communications metrics table that specifies locations of the stationary communication nodes and their respective communication metrics. Then, the computer may adjust, based on the communication metrics table, a transmission parameter of the infrastructure element. The transmission parameter includes a transmission power and/or a data throughput rate.

Figure 1:
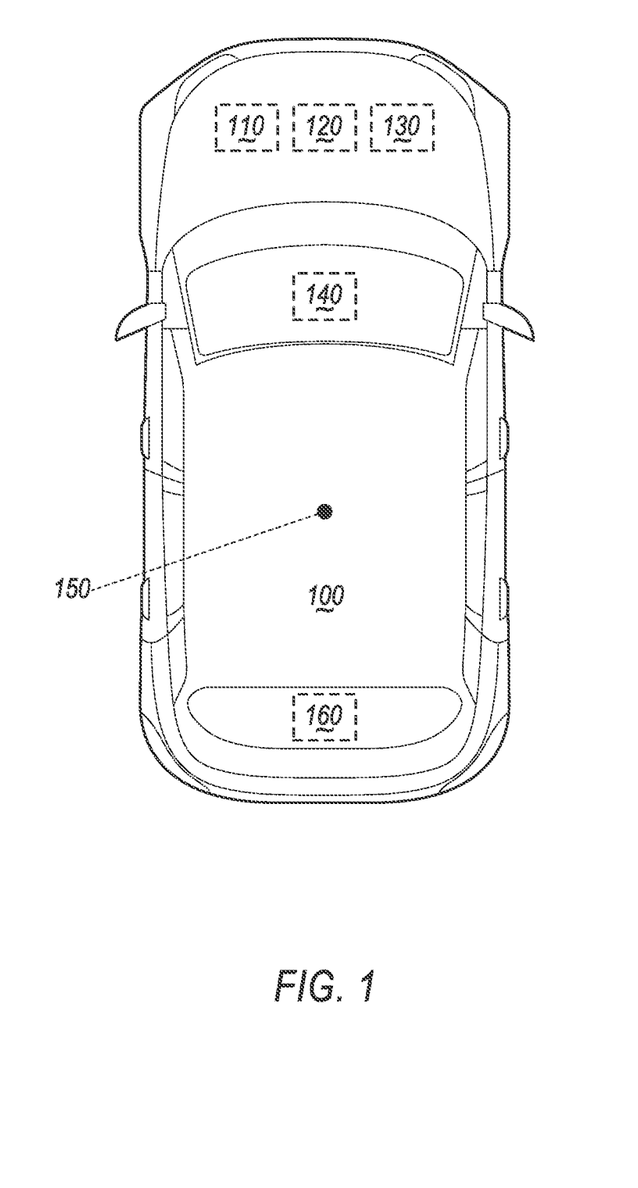
FIG. 1 is a diagram illustrating an example vehicle.

FIG. 1 illustrates a vehicle 100 which may be powered in a variety of ways, e.g., with an electric motor and/or internal combustion engine. The vehicle 100 may be a land vehicle such as a car, truck, etc. Additionally or alternatively, a vehicle 100 may be a drone, a robot, etc. Additionally or alternatively, the vehicle 100 may include a bicycle, a motorcycle, etc. A vehicle 100 may include a computer 110, actuator(s) 120, sensor(s) 130, and a Human Machine Interface (HMI 140), and a wireless communication interface 160. A reference point such as a geometrical center point 150 can be specified for a vehicle 100, e.g., a point at which respective longitudinal and lateral centerlines of the vehicle 100 intersect.

The computer 110 includes a processor and a memory such as are known. The memory includes one or more forms of computer-readable media, and stores instructions executable by the computer 110 for performing various operations, including as disclosed herein.

The computer 110 may operate the respective vehicle 100 in an autonomous, a semi-autonomous mode, or a non-autonomous (or manual) mode. For purposes of this disclosure, an autonomous mode is defined as one in which each of vehicle 100 propulsion, braking, and steering are controlled by the computer 110; in a semi-autonomous mode the computer 110 controls one or two of vehicles 100 propulsion, braking, and steering; in a non-autonomous mode a human operator controls each of vehicle 100 propulsion, braking, and steering.

The computer 110 may include programming to operate one or more of vehicle 100 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 100 communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 100 network, the computer 110 may transmit messages to various devices in the vehicle and/or receive messages from the various devices, e.g., an actuator 120, an HMI 140, etc. Additionally or alternatively, in cases where the computer 110 actually comprises a plurality of devices, the vehicle 100 communication network may be used for communications between devices represented as the computer 110 in this disclosure. Further, as mentioned below, various controllers and/or sensors may provide data to the computer 110 via the vehicle communication network.

The vehicle 100 actuators 120 are implemented via circuits, chips, or other electronic and or mechanical components that can actuate various vehicle subsystems in accordance with appropriate control signals as is known. The actuators 120 may be used to control braking, acceleration, and steering of a vehicle 100.

The sensors 130 may include a variety of devices such as are known to provide data to the computer 110. For example, the sensors 130 may include Light Detection And Ranging (LIDAR) sensor(s) 130, etc., disposed on a top of the vehicle 100, behind a vehicle 100 front windshield, around the vehicle 100, etc., that provide relative locations, sizes, and shapes of objects surrounding the vehicle 100. As another example, one or more radar sensors 130 fixed to vehicle 100 bumpers may provide data to provide locations of the objects, second vehicles 100, etc., relative to the location of the vehicle 100. The sensors 130 may further alternatively or additionally include camera sensor(s) 130, e.g. front view, side view, etc., providing images from an area surrounding the vehicle 100.

The vehicle 100 may determine a location, e.g., GPS (Global Positioning System) location coordinates, of the vehicle 100 relative to a coordinate system 270, e.g., based on data received from a vehicle 100 GPS (Global Positioning System) sensor 130. Additionally, the computer 110 may be programmed to determine a direction of the vehicle 100 movement, e.g., based on data received from the GPS sensor 130.

The HMI 140 may be configured to receive input from a human operator during operation of the vehicle 100. Moreover, an HMI 140 may be configured to display, e.g., via visual and/or audio output, information to the user. Thus, an HMI 140 may be located in the passenger compartment of the vehicle 100 and may include one or more mechanisms for user input.

The computer 110 may be configured for communicating through a wireless communication interface 160 with other vehicles 100, e.g., via a vehicle-to-vehicle (V2V), a vehicle-to-infrastructure (V-to-I) communication, and/or a vehicle-to-everything (V2X) communication network (i.e., communications that can include V2V and V2I). The communication interface 160 may include elements for sending (i.e., transmitting) and receiving radio frequency (RF) communications, e.g., chips, antenna(s), transceiver(s), etc. The V2X communication represents one or more mechanisms by which vehicle 100 computers 110 may communicate with other vehicles 100 and/or infrastructure element(s) 210 (see FIG. 2), and may be one or more of wireless communication mechanisms, including any desired combination of wireless and wired communication mechanisms and any desired network topology (or topologies when a plurality of communication mechanisms are utilized). Exemplary V2X communication protocols include cellular, IEEE 802.11, dedicated short-range communications (DSRC), and/or wide area networks (WAN), including the Internet, providing data communication services. DSRC may have one-way or two-way short-range to medium-range wireless communication channels. A V2X communication network may have multiple channels, each identified by an identifier. For example, channel 172 can be used for basic safety messages (BSM) in a V2X network.

Figure 2:
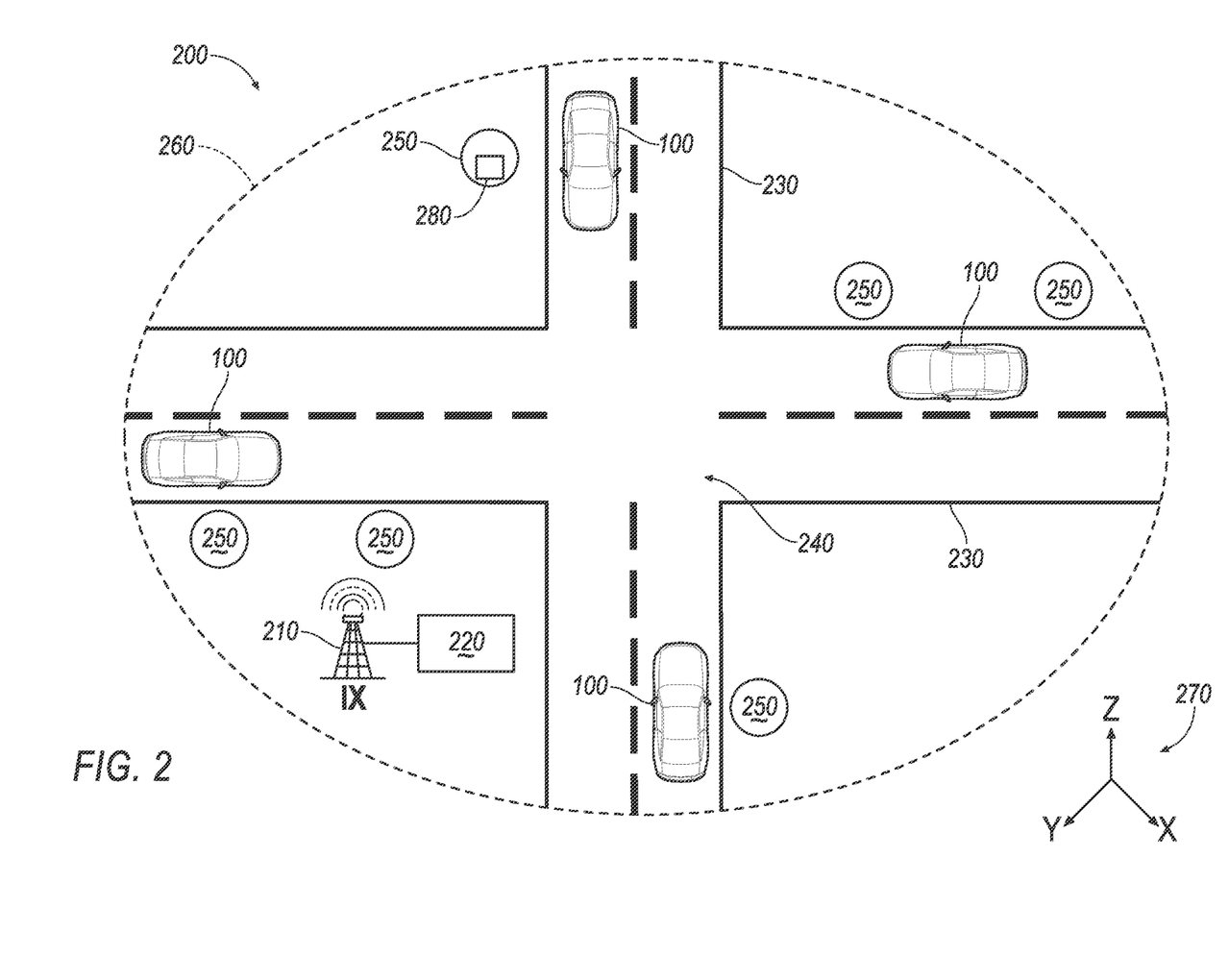
FIG. 2 is a diagram showing an infrastructure element and communication nodes within a coverage area of the infrastructure element.

FIG. 2 illustrates a system 200 including a plurality of vehicles 100 and an infrastructure element 210 including a computer 220, roads(s) 230 with intersection(s) 240, and a plurality of stationary communication nodes 250, in a coverage area 260. Although only one intersection 240 is shown, in fact, one or more intersections 240 may be located within the coverage area 260. Various types of environmental features such as vegetation, buildings, hills, etc., may be located within the coverage area 260. Although only one infrastructure element 210 is shown, multiple infrastructure elements 210 may be installed within a region and may have overlapping coverage areas 260, as discussed further below.

The infrastructure computer 220 includes a processor and a memory such as are known. The memory includes one or more forms of computer-readable media, and stores instructions executable by the computer 220 for performing various operations, including as disclosed herein. The computer 220 may be configured for communicating through one or more infrastructure elements 210 with vehicles 100 via a V2X communication protocol, e.g., DSRC or the like.

An infrastructure element 210 may include chips, antenna (s), transceiver(s), etc. The infrastructure element 210 may have a specified communication coverage area (or area 260). A coverage area 260, in the present context, is an area in which the infrastructure 210 can communicate with another computer, e.g., a vehicle 100 computer 110, a stationary communication node 250, a mobile device of a pedestrian, etc. Dimensions and/or shape of area 260 is typically based on a communication technique, communication frequency, communication power, etc., of the infrastructure element 210 as well as environmental features, a topography (i.e., an arrangement of natural and artificial physical features of an area) of the area 260, etc. In one example, an area 260 is circular and surrounds a location of the infrastructure element 210 with a diameter of 1000 meters (m). In another example (not shown), an area 260 may be rectangular and centered at the location of the infrastructure element 210 with a side length of 2000 m. A location and dimensions of a coverage area 260 may be specified with respect to a coordinate system, e.g., a Cartesian coordinate system 270. In a Cartesian coordinate system 270, coordinates of points may be specified by X, Y, and Z coordinates. X and Y coordinates, i.e., horizontal coordinates, may be global positioning system (GPS) coordinates (i.e., lateral and longitudinal coordinates) or the like, whereas a Z coordinate may specify a vertical component to a location, i.e., a height (or elevation) of a point from a specified horizontal plane, e.g., a sea level.

The infrastructure element 210 can be placed, typically permanently fixed, at a location in area 260, e.g., mounted to a stationary object such as a pole, post, road overpass, sign, etc. As shown in FIG. 2, multiple vehicles 100 on the road(s) 230 may be within the coverage area 260 of the infrastructure element 210. Road(s) 230 may be two-way (as shown in FIG. 2) or one-way. Roads 230 may have one or more lanes in each direction.

The infrastructure element computer 220 may be programmed to transmit, via the wireless network V2X, messages including data such as weather data, road condition, etc. Table 1 shows an example set of data included in a message transmitted by an infrastructure element 210. A message typically includes a header and a payload. A header may include a timestamp specifying a time of sending the message, a message source identifier, and a sequential counter. The payload may include SPAT (Signal Phase and Timing), MAP, road users detected by the infrastructure computer 220, and/or other data.

A timestamp specifies a time of generation and/or transmission of a message. The timestamp may be determined based on a local clock in the computer 220, on data received from a remote computer, etc.

A sequential counter is a counter that, upon sending each message, increases by a specified number, e.g., adding 1 (one) while counting from a start number, e.g., 0 (zero), to an end number, e.g., 100, and then resetting to the start number. A sequential counter allows a receiver of messages to determine whether one or more messages were or were not received. For example, a receiver may determine upon receiving a message that a previous message was not received, e.g., when the message counter value is 12 and a last received message counter was 10. In other words, based on a specified increase step of 1 (one) know to the receiver, the receiver determines that a message with a message counter of 10 was not received.

A source identifier identifies the source of a message. Thus, a receiver may recognize whether a message was received from an infrastructure element 210, a vehicle 100, etc., based on a source identifier included in a received message.

220 may actuate a communication interface of the infrastructure element 210 to adjust a data throughput rate R of the infrastructure element 210.

In the present context, a communication metric is a measurement of a wireless transmission, e.g., of a message or messages sent by an infrastructure element 210 and received at a location within a coverage area 260 of the respective coverage area 260. Thus, a communication metric is specified for a location and may vary from a first location to a second location within the coverage area 260, e.g., depending on physical features of the area 260, a distance from the infrastructure element 210, etc. A communication metric typically includes a received signal strength RSS, a packet error rate PER, a channel busy ratio CBR, and/or an inter-packet gap IPG.

A received signal strength RSS specifies a received signal power, e.g., specified in dBm. A packet error rate PER specifies a percentage of messages that are dropped and/or cannot be correctly decoded. An inter-packet gap IPG specifies a time interval between two consecutive messages received from an infrastructure element 210, e.g., measured in milliseconds (ms).

TABLE 1

| Message section | Datum | Description |
| --- | --- | --- |
| Header | Timestamp | A time of generating and/or transmitting. |
| | Sequence Number | A sequentially increasing and resetting number, e.g., zero to 100. |
| | Source | An identifier of message source, e.g., an infrastructure element identifier. |
| Payload | SPaT (Signal Phase and Timing) | Permission linked to maneuvers of vehicle, e.g., at an intersection. |
| Payload | MAP | Topological definition of road lanes (e.g., location coordinates), type of lanes (e.g., road, freeway, etc.), links between lanes (e.g., bridges, intersections, etc.), restrictions at lanes (e.g., "DO NOT PASS" restriction, speed limit, etc.) |
| Payload | Infrastructure object detections | States of objects such as road users around the infrastructure including position, heading, velocity, etc. |

The computer 220 can be programmed to receive one communication metrics and node identification data including node location data, from each of multiple stationary communication nodes 250 in a coverage area 260. Node identification data, in the present context, specify (i) a location of the node 250, e.g., GPS location coordinates, (ii) an identifier of a node, e.g., a combination of number and letters, etc. The computer 220 can be programmed to generate a communications metrics table that identifies locations of the stationary communication nodes 250 and specifies their respective communication metrics. The computer 220 can be programmed, based on the communication metrics table, to adjust a transmission parameter of the infrastructure element 210.

Transmission parameter, in the present context, is a parameter that controls a transmission of data from the infrastructure element 210, such as a transmission power P, a data throughput rate R, or the like. A transmission power P represents an amount of electromagnetic power, e.g., specified in decibel-milliwatts (dBm). As discussed further below, the computer 220 may actuate a communication interface of the infrastructure element 210 to radiate the power P for transmitting the V2X messages. A data throughput rate R represents a rate of transmission of a V2X message, e.g., specified in message per second (msg/sec), Hertz (Hz), etc. As discussed further below, the computer A channel busy ratio (CBR) of a channel is a proportion of channel time where the energy measured on the channel is above a specified clear channel assessment (CCA) threshold. For example, a channel busy ratio CBR can be measured by determining an amount of time, in the specified period of time, that a strength of a channel signal exceeds a threshold. A channel busy ratio may be specified as a percentage, e.g., in a range of 0% (zero percent) which means the channel is not utilized, to 100%, which means the channel is fully utilized. Alternatively, a channel busy ratio may be specified in other ways, e.g., on a numeric scale such as from zero to one, where zero means no utilization and one means full utilization. A channel busy ratio can be specified for each channel of a plurality of available channels in a V2X communication network. Thus, different channels of a V2X communication network may have different channel busy ratio values. A computer such as an infrastructure element 210 computer 220 and/or a communication node 250 computer 280 may be programmed to determine respective channel busy ratios of one or more channels of a V2X communication network. The computer 220 and/or communication node 250 computer 280 may include chips and/or other dedicated electronic components such as an ASIC (Application Specific Integrated Circuit) configured to measure a channel busy ratio of one or more communication channels.

A communication node 250 is a system that measures communication metrics of received wireless messages and if warranted, based on the measured communication metrics, then repeats the received messages. A communication node 250 is a system including an antenna for V2X communications and a computer 280 (not shown for each of the nodes 250 in FIG. 2) including a memory and a processor programmed to communicate with the infrastructure element(s) 210 via the V2X communications. Additionally, a communication node 250 may communicate with an infrastructure computer 220 via a wired communication network. The communication node 250 can receive messages from one or more infrastructure elements 210 and further broadcast messages. A range of a communication node 250 for broadcasting messages via the V2X communication network may be different from the infrastructure element 210. In other words, a coverage area of the communication node 250 may be different from a coverage area 260 of an infrastructure element 210, e.g., 100 m, 300 m, etc.

A plurality of communication nodes 250 are typically located within the coverage area 260 of the infrastructure element 210. Additionally or alternatively, coverage areas 260 of two or more infrastructure elements 210 may overlap. Thus, a communication node 250 within each of areas 260 that overlap may communicate with multiple infrastructure elements 210. A communication node 250 computer 280 can be programmed to determine the communication metrics of messages received from an infrastructure element 210 and transmit the determined metrics to the respective infrastructure element 210. Additionally or alternatively, a communication node 250 may include a dedicated electronic circuit including an ASIC that is manufactured for a particular operation, e.g., an ASIC for measuring communication metrics and/or relaying the messages. In another example, a communication node 250 may include an FPGA which is an integrated circuit manufactured to be configurable by a customer. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included inside a chip packaging.

A communication node 250 may include a location sensor, e.g., a GPS sensor, and the computer 280 may be programmed to determine location coordinates of the communication node 250 relative to the coordinate system 270 based on data received from the location sensor. Additionally or alternatively, because the communication node 250 is stationary, the location coordinates of the communication node 250 may be stored in a computer 280 memory, e.g., upon installation of the node 250 at a location, e.g., to a pole, guardrail, overhead gantry, bridge body, etc.

A communication node 250 computer 280 may be programmed to determine one or more communication metrics corresponding to an infrastructure element 210 based on a message source identifier (see example Table 1) included in the received messages. Thus, for the purpose of determining communication metrics, the communication node 250 computer 280 may be programmed to ignore a message that was received from a non-infrastructure source including a vehicle 100, a mobile device, etc. As discussed above, a communication node 250 may receive messages from more than one infrastructure element 210 when the node 250 is located in each of multiple coverage areas 260 that overlap. For example, the communication node 250 computer 280 may be programmed to determine (i) a first set of communication metrics for a first infrastructure element 210 based on messages received from the first infrastructure element 210, and (ii) a second set of communication metrics for a second infrastructure element 210 based on messages received from the second infrastructure element 210.

The communication node 250 computer 280 may be programmed to determine a received signal strength RSS of messages received from an infrastructure element 210 based on data received from the communication node 250 antenna, e.g., an amplitude of received radio frequency signal at a receiver circuit of the communication node 250.

The communication node 250 computer 280 may be programmed to determine a packet error rate PER by analyzing a set of consecutively received messages and determining how many messages are missing, e.g., based on sequence number of messages stored in the header of messages. In one example, the computer 280 may be programmed to store a set of consecutively received messages, i.e., a "history of received messages," in a FIFO (First-In First-Out) memory. The computer 280 may be programmed to store the messages received in the last, e.g., 5 second (s). The communication node 250 computer 280 may be programmed, e.g., based on Equation (1), to store messages based on a moving time window from a start time $T_{start}$ to a current time t. Time to is a time of starting operation, e.g., powering ON the communication node 250, of the communication node 250, e.g., 0 (zero). In other words, the communication mode 250 computer 280 may be programmed to store up to 5 seconds of recently received messages. If, for example, the computer 280 was turned on 2 s ago, then the history of recent messages, e.g., the FIFO memory, includes messages of last 2 s. The computer 280 may be programmed to dispose data from messages outside the time window, i.e., messages from before $T_{start}$.

$$T_{start} = \max(t_0, t-5) \quad (1)$$

The communication node 250 computer 280 may be programmed, e.g., based on Equation (2), to determine the packet error rate PER based on the stored history of the received messages. The communication node 250 computer may be programmed to determine number of total data (e.g., a number of total messages) for the time from start time $T_{start}$ to current time t, e.g., based on a cycle time of a message received from the infrastructure element 210. For example, the communication node 250 computer may determine a number of total data is 50 messages based on a cycle time of 100 ms. The communication node 250 computer may determine a number of missing data, e.g., a number of missing messages based on various techniques. In one example, the communication node 250 computer may be programmed to determine a number of missing messages based on the sequence number of received messages, as discussed above with respect to Table 1.

$$PER = \frac{\text{Num of missing data}}{\text{Num of total data}} \quad (2)$$

As discussed above, a communication node 250, located within each of multiple coverage areas 260 that overlap, may be receiving messages from multiple infrastructure elements 210. Thus, the communication node 250 computer 280 may be programmed to store one history of received messages per infrastructure element 210, e.g., a first history of last 5 seconds of messages received from a first infrastructure element 210 and a second history of last 5 seconds of messages received from a second infrastructure element 210. As a result of that the communication node 250 computer can be programmed to determine a first packet error rate PER for the first infrastructure element 210 and a second packet error rate PER for the second infrastructure element 210.

A communication node 250 computer may be programmed to determine an inter-packet gap IPG based on timestamps of received messages, e.g., a difference between the timestamp of a most recent received message and a timestamp of the last message (in other words, timestamp difference between last two consecutively received messages).

The processor of each of the communication nodes 250 may be programmed to transmit the determined communication metrics of the respective communication node 250 and node identification data including node 250 location data to the infrastructure element 210. Table 2 shows an example set of data that each communication node 250 may transmit to the infrastructure element 210.

TABLE 2

| Datum | Description |
| --- | --- |
| Infrastructure element identifier | An identifier of the infrastructure element based on which the communication metric are determined. |
| Communication node location | Location coordinates of the node, e.g., GPS coordinates |
| IPG | Inter-Packet Gap |
| RSS | Received Signal Strength |
| PER | Packet Error Rate |

In one example, when a communication node 250 is located within an overlapping coverage area 260 of a first and a second infrastructure element 210, then the communication node 250 may transmit (i) a first set of data according to Table 2 including an identifier of the first infrastructure element 210 to the first infrastructure element 210 and (ii) a second set of data according to Table 2 including the identifier of the second infrastructure element 210 to the second infrastructure element 210. Thus, each of the infrastructure elements 210 may recognize the corresponding set of data based on the corresponding element 210 identifier included in each set of data.

A communication node 250 computer 280 may be programmed to determine to relay a message received from an infrastructure element 210 based on comparing the determined communication metrics table to one or more thresholds, e.g., a packet error rate threshold, a received signal strength threshold, an inter-packet gap threshold.

In the present context, relaying by a communication node 250 means that the communication node 250 resends the message which was received from an infrastructure element 210. Typically, a relayed message has a same data load or content as an original message. The communication node 250 computer 280 may be programmed to relay a message received from the infrastructure element upon determining that (i) a received signal strength RSS is less than the signal strength threshold, e.g., −75 dBm, or a packet error rate (PER) exceeding a PER threshold, e.g., 70%, and (ii) a channel busy ratio (CBR) is less than a CBR threshold, e.g., 60%. The communication node 250 computer 280 may determine whether to relay a message based on the channel busy ratio because relaying messages may increase a CBR of the communication channel. Additionally or alternatively, a communication node 250 may receive an original message of the infrastructure element 210 via the Internet or the like, e.g., from a cloud server. This may help receiving the original message for relaying when the communication node 250 does not receive the messages via V2X network, e.g., due to packet error rate PER of 80% or higher.

The locations of the communication nodes 250 are determined based on road 230 locations, intersection 240 locations in the coverage area 260 of the infrastructure element 210. For example, the communication nodes 250 may be installed near (e.g., within 100 meters) intersections. The communication nodes 250 may be primarily installed on a side of the road 230 heading toward an intersection 240 compared to a side of the road 230 heading away from the intersection 240.

Now turning to the infrastructure 210 operation, the computer 220 can be programmed to generate a communication metric table for the infrastructure element 210 based on data (e.g., see Table 2) received from the communication nodes 250 within the node 250 coverage area 260. The computer 220 may be programmed to generate the communication metric table based on data received, from the communication nodes 250. Table 3 shows an example communication metric table of the infrastructure element 210. Table 3 includes data from n communication nodes 250. Each row specifies location coordinates of a communication node 250, e.g., GPS location coordinates, and received communication metrics of the respective communication node 250.

TABLE 3

| Location coordinates | PER | IPG | RSS |
| --- | --- | --- | --- |
| $x_1, y_1$ | $PER_1$ | $IPG_1$ | $RSS_1$ |
| ... | ... | ... | ... |
| $x_n, y_n$ | $PER_n$ | $IPG_n$ | $RSS_n$ |

The computer 220 may be programmed to update the communication metrics table based on the received data upon receiving data including updated communication metrics from one of the stationary communication nodes 250 already present in the communication metrics table. Additionally or alternatively, the computer 220 may be programmed to update the communication metrics table based on communication metrics of a new stationary communication node 250 within the specified coverage area 260. In other words, upon receiving data from a communication node 250, the computer 220 may be programmed to determine whether the communication node 250 metrics were previously entered in the communication metrics table, e.g., by verifying whether a row with matching node identification data (e.g., location coordinates) exists in the communication metrics table. In the present context, node identification data for a node 250 matches a row of the table when a distance between the location identified by the table in the respective row to the location of the node 250 is less than a distance threshold, e.g., 5 meters. Upon determining that the respective communication node 250 data were previously stored in the communication metrics table, the computer 220 may update the metrics, e.g., updating any of metrics such as packet error rate PER, using the received data. Upon determining that the respective communication node 250 data do not exist in the communication metrics table, e.g., no row with matching location coordinates exists in the metrics table, then the computer 220 may add a new row, e.g., a row indexed as n+1, to the communication metric table based on the received data.

As discussed above, a communication node 250 computer 280 may be programmed to relay messages received from the infrastructure element 210 based on the communication metrics of the node 250. Additionally or alternatively, the computer 220 can be programmed to adjust, based on the communication metrics table, a transmission parameter of the infrastructure element 210. A vehicle 100 in the area 260 which may have not received a message from the infrastructure element 210, may receive the relayed message from a communication node 250 nearby, e.g., on a side of the road 230.

In one example, the computer 220 may be programmed to increase the transmission power P of the infrastructure element 210 upon determining that the received signal strength RSS of at least one of the stationary communication nodes within the specified range is less than a signal strength threshold, e.g., −75 dBm. The computer 220 may increase a transmission power P of an infrastructure element 210 by actuating increase an amplifier gain of a radio frequency (RF) amplifier circuit. In one example, the computer 220 may be programmed to increase the transmission power P incrementally, e.g., 5 dBm and then upon determining that the received signal strength RSS of at least one node 250 is still less than the threshold, repeat the step of increasing of the transmission power P. The computer 220 may be programmed to stop increasing the transmission power P upon determining that the received signal strength RSS of each of the communication nodes 250 exceeds the signal strength threshold. The transmission power at time $t_k$ can be regulated by applying the formula $P(t_k)=P(t_{k-1})+\alpha(\min(RSS_i)-RSS_d)$, where $\alpha$ is a positive constant (e.g., $\alpha=0.5$), $\min(RSS_i)$ represents the minimum of all the RSS values in Table 3, and $RSS_d$ denotes the desired RSS value (e.g., $RSS_d=-75$ dBm). In practice, the transmission power of communication device is divided into discrete levels. For example, the choice of transmission power may be 0 dBm, 10 dBm, 20 dBm, 35 dBm. Therefore, we typically round the value of transmission power $P(t_k)$ to the nearest level of transmission power. This technique can adaptively adjust (i.e., increase or decrease) the transmission power such that the RSS within the communication range is around the desired value. If transmission power $P(t_k)$ has reached the highest level of transmission power but $\min(RSS_i)$ is still below the desired value, it implies that the communication may be blocked by the environment. In this case, the communication node 250 of which the RSS is below the desired value will start to relay the message.

The infrastructure element 210 may include one or more directional antennas. Thus, the computer 220 may change a transmission power P of a first directional antenna while maintaining the transmission power P of a second directional antenna included in the infrastructure element 210. The computer 220 may be programmed to select a directional antenna of the infrastructure element 210 based on an antenna direction and a geographic location of the communication node 250 reporting the respective signal strength RSS being less than a received signal strength threshold. The computer 220 may be programmed to increase the transmission power P of the selected directional antenna based on the received signal strength RSS of the respective communication node 250.

The computer 220 may store data including coverage area 260 of each directional antenna. Thus, when an infrastructure element 210 includes directional antennas, then the coverage area 260 of the infrastructure element 210 includes a plurality of coverage areas 260, which may or may not overlap, of respective directional antennas. The computer 220 may be programmed to select a directional antenna based on location coordinates of a communication node 250 and the coverage areas 260 of each of the directional antennas. The computer 220 may be programmed to increase the transmission power P of the selected directional antenna.

Additionally or alternatively, the computer 220 may be programmed to reduce the data throughput of the infrastructure element 210 upon determining that the channel busy ratio CBR of at least one of the communication nodes 250 exceeds a CBR threshold. For example, the computer 220 may be programmed to reduce the data throughput of the infrastructure element 210 by (i) stopping broadcast of specified types of information, e.g., non-critical information about weather condition, and/or (ii) reducing a cycle time of data transmission, e.g., increasing a cycle time of message transmission by 10%.

Processing

Figure 3:
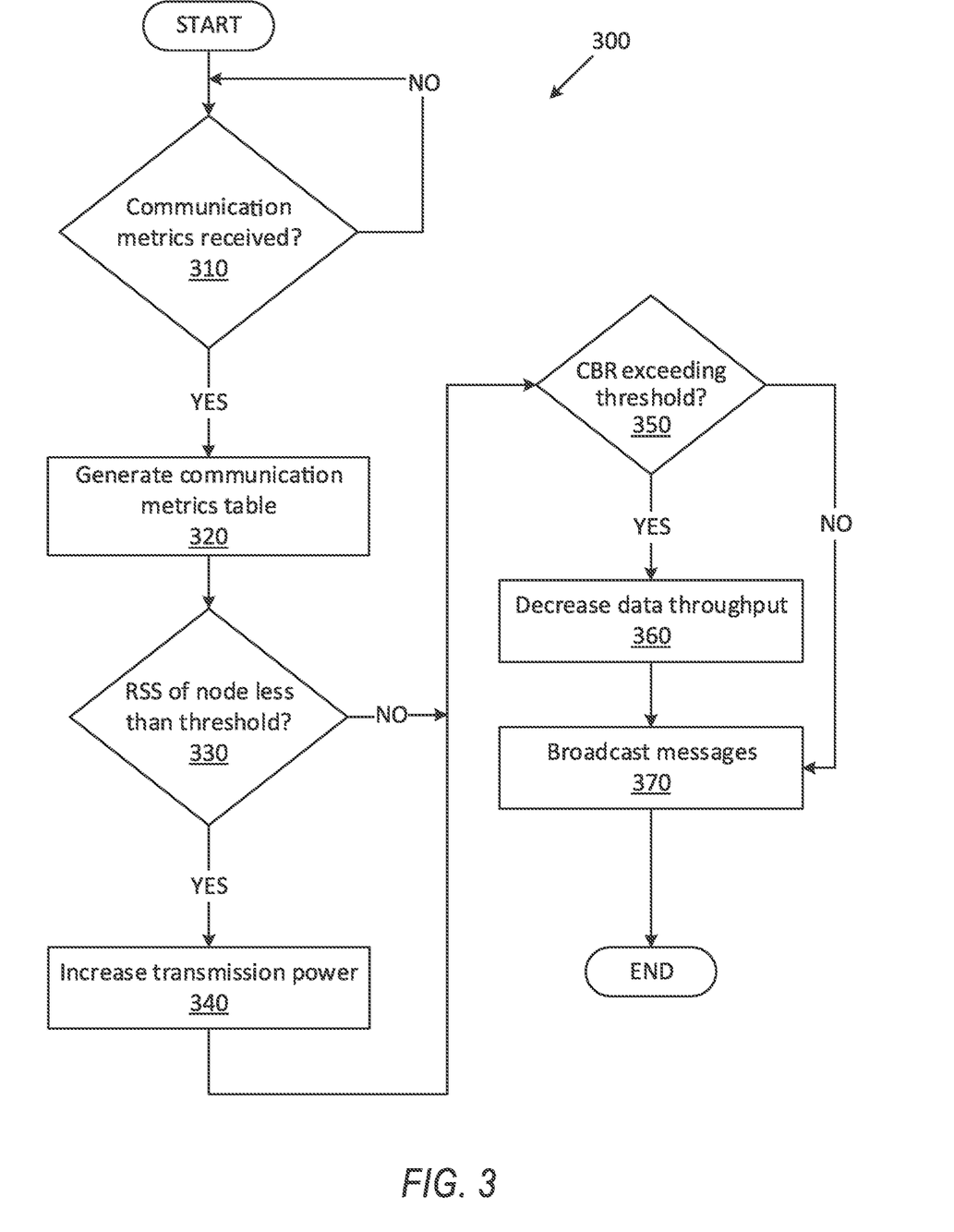
FIG. 3 is a flowchart of an exemplary process for operating the infrastructure element of FIG. 2.

FIG. 3 is a flowchart of an exemplary process 300 for operating an infrastructure element 210. A computer 220 may be programmed to execute blocks of the process 300.

The process 300 begins in a decision block 310, in which the computer 220 determines whether communication metrics are received from one or more communication nodes 250 within the coverage area 260 of the infrastructure element 210. The computer 220 may be programmed to receive communication metrics (e.g., data such as shown in example Table 2), of the communication nodes 250 via the V2X communication network and/or a wired communication network. The computer 220 may determine, based on an identifier of the infrastructure element 210 included in a received message, whether the received message corresponds to the respective infrastructure element 210, e.g., whether the source identifier included in the message matches the infrastructure element 210 identifier. If the computer 220 determines that the communication metrics are received from one or more communication nodes 250, then the process 300 proceeds to a block 320; otherwise the process 300 returns to the decision block 310.

In the block 320, the computer 220 generates a communication metric table based on the received communication metrics from the communication nodes 250. The computer 220 may be programmed to generate a communication metrics table (e.g., Table 3) based on the data received from the communication nodes 250 including communication metrics and location coordinates of nodes 250. Additionally or alternatively, the computer 220 may be programmed to update a stored communication metrics table based on the received communication metric.

Next, in a decision block 330, the computer 220 determines whether a received signal strength of one or more communication nodes 250 is less than a stored threshold, e.g., −75 dBm. If the received signal strength of at least one of the rows of the communication metrics table (e.g., Table 3) is less than the threshold, then the process 300 proceeds to a block 340; otherwise the process 300 proceeds to a decision block 350.

In the block 340, the computer 220 increases a transmission power P of the infrastructure element 210. The computer 220 may be programmed to actuate an amplifier circuit of the infrastructure element 210 antenna to increase a transmission power P. As discussed above, the increase of transmission power P may be performed in an incremental manner. Thus, the computer 220 may determine to stop an incremental increase of power P upon determining that the received signal strength RSS of each of the communication nodes 250 in the coverage area 260 exceeds the threshold.

Following either of the blocks 330, 340, in the decision block 350, the computer 220 determines whether a channel busy ratio CBR of one or more communication node 250 exceeds a threshold. The computer 220 may be programmed to determine whether the CBR exceeds a threshold upon determining based on the communication metrics table that at least at one communication node 250 the CBR exceeds the threshold, e.g., 70%. If the computer 220 determines that the CBR exceeds the threshold, then the process 300 proceeds to a block 360; otherwise the process 300 proceeds to a block 370.

In the block 360, the computer 220 decreases the data throughput of the infrastructure element 210. For example, the computer 220 may decrease the data throughput rate R by increasing (e.g., 5%) a cycle time of message transmitted by the infrastructure element 210, and/or by stopping transmission of specified types of messages including non-critical information.

Next, in a block 370, the computer 220 broadcasts messages from the infrastructure element 210. The computer 220 may transmit messages including data such as shown in example Table 1. Thus, vehicle(s) 100, communication node(s) 250, etc., may receive the broadcasted messages of the infrastructure element 210.

Following the block 370, the process 300 ends, or alternatively returns to the decision block 310, although not shown in FIG. 3.

Figure 4:
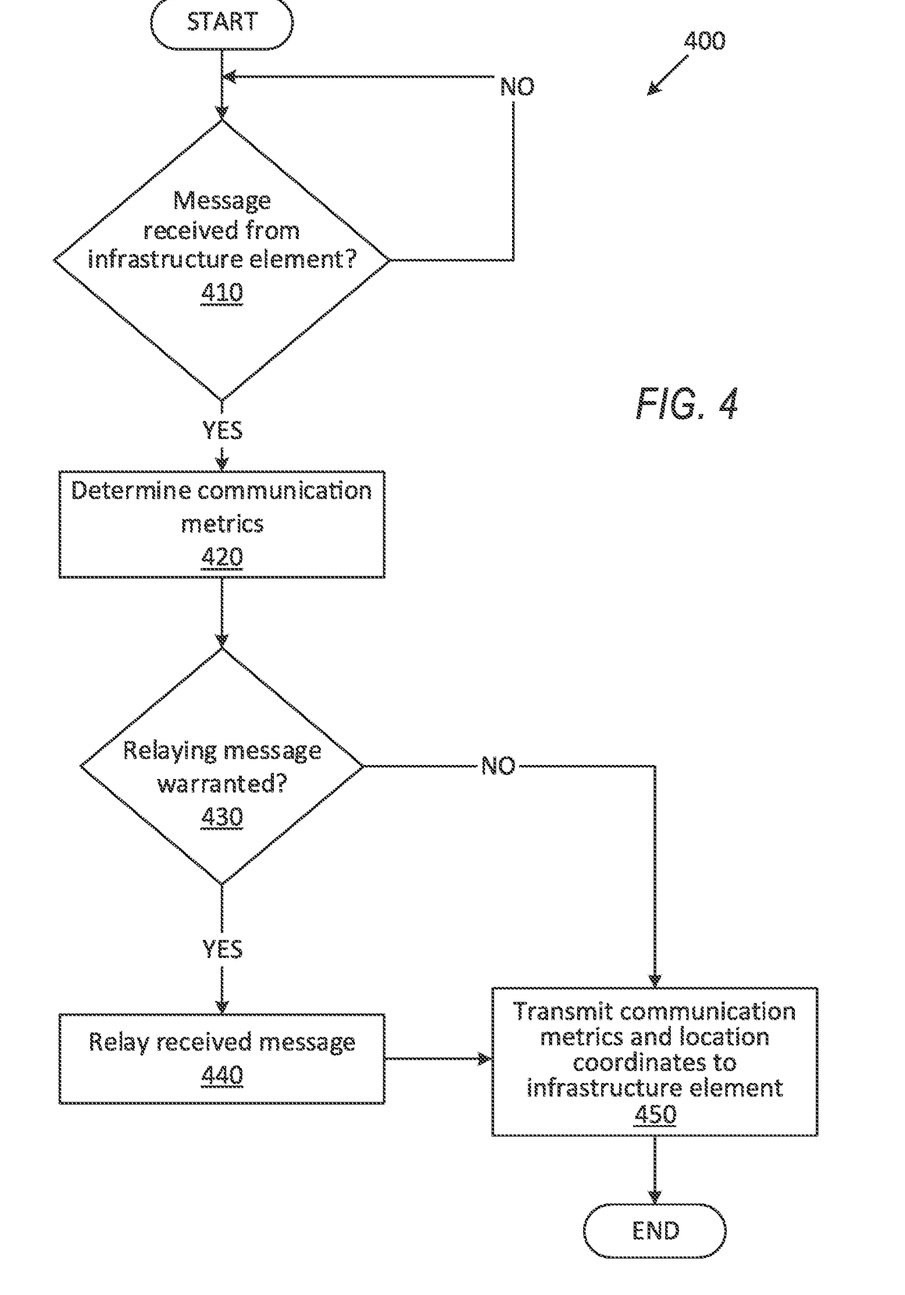
FIG. 4 is a flowchart of an exemplary process for operating the communication nodes of FIG. 2.

FIG. 4 is a flowchart of an exemplary process 400 for operating a communication nodes 250. A communication node 250 computer 280 may be programmed to execute blocks of the process 400.

The process 400 begins in a decision block 410, in which the computer 280 determines whether a message is received from an infrastructure element 210. The computer 280 may be programmed to determine whether a message is received from an infrastructure element 210 based on a message source identifier included in the received message, e.g. included in a message header of Table 1. If the computer 280 determines that the message is received from an infrastructure element 210, then the process 400 proceeds to a block 420; otherwise the process 400 returns to the decision block 410.

In the block 420, the computer 280 determines the communication metric(s) of the node 250. The computer 280 may be programmed to determine the communication metrics such as received signal strength RSS, packet error rate PER, inter-packet gap IPG, etc., based on the received message. Further, the computer 280 may be programmed to determine location coordinates, e.g., GPS coordinates, of the communication node 250 based on data received from a location sensor, e.g., a GPS sensor, included in the communication node 250, and/or location data stored in a computer 280 memory. The computer 280 may be programmed to determine the channel busy ratio CBR and/or receive the channel busy ratio CBR from the infrastructure element 210.

Next, in a decision block 430, the computer 280 determines whether relaying the message received from the infrastructure element 210 is warranted. The computer 280 may be programmed to determine that relaying the message is warranted upon determining that (i) a received signal strength RSS is less than the signal strength threshold, e.g., −75 dBm, or a packet error rate PER exceed a packet error rate threshold, e.g., 70%, and (ii) a channel busy ratio CBR is less than a channel busy ratio threshold, 60%. If the computer 280 determines that the relaying of the received message is warranted, the process 400 proceeds to a block 440; otherwise the process 400 proceeds to a block 450.

In the block 440, the computer 280 relays the message received from the infrastructure either via the V2X communication network, from a cloud server via the Internet or the like, etc. For example, a vehicle 100 in the coverage area 260, e.g., within a distance less than a range of the communication node 250 may receive the relayed message.

Following either of the blocks 430, 440, in a block 450, the computer 280 transmits the communication metrics and location coordinates of the communication node 250 to the infrastructure element 210. The computer 280 may be programmed to transmit a set of data such as shown in example Table 2. Following the block 450, the process 400 ends, or alternatively returns to the decision block 410, although not shown in FIG. 4.

The article "a" modifying a noun should be understood as meaning one or more unless stated otherwise, or context requires otherwise. The phrase "based on" encompasses being partly or entirely based on.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising an infrastructure element having a computer programmed to:
   receive one or more communication metrics, and node identification data including node location data, from each of a plurality of stationary communication nodes coverage area;
   generate a communication metrics table that identifies locations of the stationary communication nodes and specifies their respective communication metrics; and
   based on the communication metrics table, adjust a transmission parameter of the infrastructure element, the transmission parameter including at least one of a transmission power or a data throughput rate;
   wherein the computer of the infrastructure element is further programmed to increase the transmission power of the infrastructure element upon determining that a signal strength of at least one of the stationary communication nodes within the specified range is less than a threshold;
   wherein adjusting a transmission parameter of the infrastructure element includes selecting a directional antenna of the infrastructure element based on an antenna direction and a geographic location of the stationary communication node reporting the respective signal strength being less than the threshold, and increasing the transmission power of the selected directional antenna based on the signal strength of the respective stationary communication node.

2. A system, comprising:
   a plurality of stationary communication nodes, each including a processor that is programmed to:
      determine one or more communication metrics of the respective communication node, including by ignoring a received message for determining the one or more communication metrics upon determining that the message was received from a non-infrastructure source including a vehicle and a mobile device;
      determine whether to relay a message received from an infrastructure element based on comparing the one or more communication metrics to one or more thresholds; and
      broadcast the one or more communication metrics and one or more node identification data that include a communication node location; and
   the infrastructure element, including a computer programmed to:
      receive one or more communication metrics, and node identification data including node location data, from each of the plurality of stationary communication nodes;
      generate a communication metrics table that identifies locations of the stationary communication nodes and specifies their respective communication metrics; and
      based on the communication metrics table, adjust a transmission parameter of the infrastructure element, the transmission parameter including at least one of a transmission power or a data throughput rate.

3. The system of claim 2, wherein the plurality of communication nodes are located within a specified coverage area of the infrastructure element.

4. The system of claim 2, wherein the one or more communication metrics include at least one of a signal strength, a packet error rate, a channel busy ratio, or an inter-packet gap.

5. The system of claim 2, wherein the computer of the infrastructure element is further programmed to update the communication metrics table based on the received data upon receiving data including (i) updated communication metrics from one of the stationary communication nodes, or (ii) communication metrics of a new stationary communication node within a specified coverage area of the infrastructure element.

6. The system of claim 2, wherein the computer of the infrastructure element is further programmed to increase the transmission power of the infrastructure element upon determining that a signal strength of at least one of the stationary communication nodes within the specified range is less than a threshold.

7. The system of claim 6, wherein the computer of the infrastructure is further programmed to:
   select a directional antenna of the infrastructure element based on an antenna direction and a geographic location of the stationary communication node reporting the respective signal strength being less than the threshold; and
   increase the transmission power of the selected directional antenna based on the signal strength of the respective stationary communication node.

8. The system of claim 2, wherein the computer of the infrastructure is further programmed to reduce the data throughput of the infrastructure element upon determining that a packet error rate of at least one of the stationary communication nodes exceeds a threshold.

9. The system of claim 2, wherein the processor of each stationary communication node is further programmed to relay a message received from the infrastructure element upon determining that (i) a signal strength is less than a signal strength threshold, or a packet error rate exceeds a packet error rate threshold, and (ii) a channel busy ratio is less than the channel busy ratio threshold.

10. The system of claim 2, wherein installation locations of the plurality of stationary communication nodes are determined based on road locations or intersection locations in the coverage area of the infrastructure element.

11. A method, comprising:
- receiving one or more communication metrics, and node identification data including node location data, from each of a plurality of stationary communication nodes, wherein, in each of the stationary communication nodes, a received message is ignored for determining the one or more communication metrics upon determining that the message was received from a non-infrastructure source including a vehicle and a mobile device;
- generating a communication metrics table that identifies locations of the stationary communication nodes and specifies their respective communication metrics; and
- based on the communication metrics table, adjusting a transmission parameter of an infrastructure element, the transmission parameter including at least one of a transmission power or a data throughput rate;
- determining, in each of the stationary communication nodes, the one or more communication metrics of the respective communication node;
- determining whether to relay a message received from the infrastructure element based on comparing the one or more communication metrics to one or more thresholds; and
- broadcasting the one or more communication metrics and one or more node identification data that include the location.

12. The method of claim 11, further comprising updating the communication metrics table based on the received data upon receiving data including (i) updated communication metrics from one of the stationary communication nodes, or (ii) communication metrics of a new stationary communication node within a specified coverage area.

13. The method of claim 11, further comprising increasing the transmission power of the infrastructure element upon determining that a signal strength of at least one of the stationary communication nodes within the specified range is less than a threshold.

14. The method of claim 13, further comprising:
- selecting a directional antenna of the infrastructure element based on an antenna direction and a geographic location of the stationary communication node reporting the respective signal strength being less than the threshold; and
- increasing the transmission power of the selected directional antenna based on the signal strength of the respective stationary communication node.

15. The method of claim 13, further comprising reducing the data throughput of the infrastructure element upon determining that the packet error rate of at least one of the stationary communication nodes exceeds a threshold.

16. The method of claim 11, further comprising relaying, in each of the stationary communication nodes, a message received from the infrastructure element upon determining that (i) a signal strength is less than a signal strength threshold, or a packet error rate exceeds a packet error rate threshold, and (ii) a channel busy ratio is less than the channel busy ratio threshold.

* * * * *